United States Patent Office 3,598,640
Patented Aug. 10, 1971

3,598,640
REAR PROJECTION SCREEN, SCREEN
COATING AND METHOD
Frank P. Bennett, Northbrook, Ill., assignor to
GAF Corporation, New York, N.Y.
No Drawing. Filed Jan. 19, 1968, Ser. No. 701,039
Int. Cl. C03c 17/32
U.S. Cl. 117—124                       9 Claims

ABSTRACT OF THE DISCLOSURE

A rear projection screen which includes, on the rear or image-receiving face thereof, a coating comprising a transparent organic vehicle and a small proportion of a light-diffusing silica material preferably a synthetic, amorphous silica having generally micron-sized particles, and wherein substantially all of the particles include capillary passages therein, and wherein a substantial proportion of the silica particles are held in place by said vehicle at the outer surface of the coating in a manner such that at least portions of the particles are exposed to atmosphere, rather than being completely embedded in the vehicle of the coating material.

The method includes dispersing the silica in a lacquer to form a coating composition, then spraying this composition onto the screen and drying the coating in a manner allowing the particles of silica at the outer surface of the coating to be at least partially exposed to the atmosphere.

BACKGROUND

Field of the invention

The field of the present invention relates to a so-called rear projection screen, that is, a screen made of glass, clear plastic, or like material, upon one side of which an image is projected to be viewed from the other side of the screen. In such a screen the surface provided on the side receiving projected light is designed to diffuse the light to the extent that an image will appear thereon, but not to an extent which will obscure the image, or substantially reduce light transmission, or render the screen opaque.

The field of the invention also embraces rear projection screen compositions and methods of preparing and applying such compositions to various substrates to form rear projection screens.

DESCRIPTION OF THE PRIOR ART

In the prior art, one method of treating a sheet material to form a rear projection screen includes imparting a ground textured surface to the rear face thereof so that an image projected onto the screen will appear at this surface. For example, ground glass makes an excellent screen according to this technique but such screen is extremely expensive.

Substitutes for ground glass are known in the prior art, such as screens having for example, finely divided glass particles, small glass or plastic balls or minature spheres, or in some cases, glass cylinders or fibers adhered to the rear surface of the glass screen. Other prior art screens have been coated with inorganic materials, such as a frit including magnesium fluoride, silicon dioxide or monoxide, or the like, in their crystalline forms.

Screens such as these have been generally satisfactory as far as performance is concerned, but these prior art screens have all been quite expensive and manufacture thereof requires highly skilled labor and close tolerance quality control conditions. These prior art efforts have not succeeded, however, in providing a screen characterized by superior image resolution, color fidelity, contrast, brightness, and other desirable properties and which can be manufactured at reasonable cost under high standards of quality control without expensive and elaborate equipment.

Recently, there has been a greatly increased demand for low cost, high quality screens of the rear projection type due to the increased popularity of devices which utilize such screens. Typical of such devices are slide viewing devices, viewing accessories for slide and movie projectors, and other devices which include projector means, such as amusement devices and teaching aids.

Accordingly, there exists a significant demand for a rear projection screen which will combine the advantages of satisfactory performance and low cost, as well as a demand for a coating system or method which will be characterized by lack of criticality in the steps of applying the coating and controlling the thickness of the same, so that obtaining excellent quality control will not impose high costs on the manufacture of such screens.

OBJECTS OF THE INVENTION

A primary object of the invention is to overcome the disadvantages of the prior art set forth above and to provide an inexpensive rear projection screen having superior image resolution, color fidelity, image brightness, extraneous light contrast, and wide angle viewing characteristics.

Another object of the invention is to provide an improved screen, such as that described above, wherein the screen material may be made of a plastic having a neutral darkening tint for increased contrast, and wherein the coating applied to the screen is a neutral or synthetic lacquer material containing finely divided, amorphous silica particles having a narrow range of particle size.

The invention achieves its objects by providing a rear projection screen including a screen member having front and rear faces with the rear face being covered by a coating layer containing, at its outer surface, a plurality of finely divided silica particles having capillary passages therein, the particles being trapped by the coating and held on said surface thereby, but not being completely covered or embedded by the coating material.

DESCRIPTION OF THE PREFERRED EMBODIMENTS

Rear projection screens according to the present invention were prepared in accordance with the method set forth below.

EXAMPLE 1

A screen specimen of approximately six by eight inches was selected from a polymethyl methacrylate sheet material of an optical grade having a neutral or gray tint or colorant therein. This material has a uniform thickness and a slight curvature therto, in the order of an 80 inch radius of curvature. One such tinted material is a polymethyl methacrylate sheet supplied by Rohm & Haas Company known as "Plexiglas," No. GM-2233, and another material is Monsanto Chemical Company's "Lustrex-Lustran A," No. 12705A.

The next step was the preparation of a so-called mill base. First, a synthetically prepared, finely divided, amorphous silica was selected. This material has many fine capillary passages, pores, interstices or the like extending therethrough. This silica, which is prepared from sodium silicate comprising substantially 99% $SiO_2$, has an average particle size of about 3.3 microns, a size range of about 2 to 6 microns, and a surface area of 300 square meters per gram.

As used herein and in the claims, the term "capillary" is not intended to mean passages having any particular size or range of sizes and means only that such passages or interstices are small enough, generally, to extend through particles having sizes of less than three microns. A substantial number of such passages are present in each particle as is evident from the above mentioned surface area of the silica.

According to the next step, one part by weight of this silica was added to nine parts by weight of a nitrocellulose base lacquer vehicle. To this silica and lacquer mixture was added 1% by weight of castor oil, as a suspension aid, and the mix was placed in a high shear, high speed mixer (a Waring Blendor) and blended for five minutes, whereupon the silica was substantially completely suspended in the lacquer. This mill base material, owing to the presence of the suspension aid, is a fairly stable dispersion which may be stored for some time. Any silica settling out may be dispersed again by mild stirring or agitation.

When referring to the term "mill base," as set forth above, there is intended to be meant a stock solution of a dispersion which carries as much of the dispersed silica therein as will normally remain dispersed without forming a gum or caked mass upon being stored, but which can later be thinned by adding additional lacquer to the mix, as set forth below.

Next, a spraying composition was prepared by mixing the mill base described above with more lacquer in the ratio of four parts of mill base to six additional parts lacquer. Normally, when making a mix of several gallons, it is preferred to add the lacquer slowly to the mill base, i.e., over a period of at least one minute, to prevent undue "seeding" or premature settling out, nucleation or agglomeration of the silica particles.

Thereupon, the spray coating mixture was sprayed onto one surface of the acrylic screen by conventional technique with a spray painting gun in a thickness of from about .005 to .025 of an inch. The preferred spraying technique is to spray a light but visibly wet coat on the surface, allowing it to air dry, and then apply a second coat of about the same thickness which will result in a coating having the thickness referred to above.

A simple test for determining when a sufficient thickness of coating has been applied is to project an image on a sample screen and note whether spectral light may be observed, that is, whether a so-called "hot spot" can be seen when the image is examined. A properly coated screen will transmit enough light for bright image presentation but will not exhibit spectral light or "hot spots" which indicate a coating of insufficient thickness or the lack of sufficient silica in the coating material.

It has been discovered that up to a point, a higher concentration of material in the spray mix tends to diminish forward brilliance somewhat, but gives a capability of excellent wide angle viewing. When too much silica is dispersed in the mix or is present on the dry surface of the coating, an almost opaque, white colored surface becomes apparent.

A desired coating thickness and silica concentration is such that the rear of the screen appears to be translucent, yet possesses a somewhat crystalline appearance. The preferred concentration of silica in the final spray mix is in the range of about 1% to 5%, by weight, and preferably about 3½% to 4%.

Since, as pointed above, the mill base used to prepare the spray coating material is intended to be stored for a certain time before use, castor oil or other suspending aid is used in preparing the mill base. However, its use is not strictly necessary, since the castor oil may be omitted if the spray coating material is to be used immediately after preparation thereof.

When a rear projection screen was prepared in accordance with the above procedure, the resulting screen exhibited excellent image resolution, color fidelity, brightness, and maintained these characteristics even where there was substantial extraneous light falling on the front of the screen. In addition, these properties were exhibited even when the screen was viewed from a line of sight which was at a substantial angle from a line perpendicular to the face of the screen.

The provision of the slight curvature in the screen is not necessary, but adds to the pleasing appearance of the screen, and renders surface defects in the screen material less noticeable.

EXAMPLE 2

Another projection screen was made according to the method set forth above, except that the substrate or screen material was selected from optical quality glass having a slight curvature thereto, and the glass was somewhat thicker than the synthetic acrylic material. The coating adhered well to the glass and the resulting screen was excellent in all the properties referred to above, thereby demonstrating that the method of the invention is useful where glass as well as plastic is used as a screen material.

EXAMPLE 3

In another case, a plastic or glass screen was provided, and a coating was applied thereto as set forth above, except that instead of nitrocellulose the lacquer vehicle comprised a synthetic vinyl lacquer composition containing about 15% vinyl resin, 3% cyclohexanone, about 61% di-isobutyl ketone, 10% xylol, and about 10% MIBK (methyl-isobutyl ketone), with up to 1% of a plasticizer, such as di-butyl phthalate. This vinyl lacquer, with the finely divided silica suspended therein, was applied to the screen, and a screen having excellent properties of resolution, brightness, contrast, color fidelity, and freedom from criticality in viewing angles resulted.

EXAMPLE 4

A rear projection screen was prepared according to the method described in Example 1, except that the material used for the screen was a clear styrene plastic material, and the lacquer vehicle, rather than comprising a solvent system which included ketones and other strong organic solvents which attack polystyrene, comprised a vinyl or acrylic lacquer emulsion, that is, the vinyl resin was dispersed in water in a manner well known in the coating art, rather than being in a true solution. Alternatively, the lacquer material may be used in a solvent system, but a solvent is selected which does not attack the styrene screen material.

SUMMARY

All the reasons for the success of the present invention are not fully understood, or known with certainty. However, with the coating and method of the invention, it is believed that upon or shortly after application of the coating, the particles at or near the coating surface, that is, at the coating-air interface, either are not strongly wetted by the coating or the coating loses its wetting action on the particles to a certain extent, and therefore, those particles at or near the surface tend to reach an equilibrium in which many such particles have portions thereof extending outwardly into the air from the body of the coating at the surface thereof.

It is also thought possible that, although the particles are satisfactorily dispersed during blending, a certain proportion of the particles are not completely wetted by the coating vehicle, or do not stay completely wetted after application. In this case, it is possible that the behavior of these particles is that set forth above, and it is also probable that the surface and near-surface portions of the coating may contain a relatively higher proportion of the silica particles than the body of the coating.

In any event, it is known that much greater light reflectivity and diffusion occurs at an air-particle interface than at a coating-particle or vehicle-particle interface, and that such interfacial area is present in substantial degree only at the surface of coating where the capillary passages in the silica particles present a large interfacial area. As a result, the light diffusion effect causing the image to appear may be termed a surface effect and is therefore relatively independent of the percentage of particles in the body of the coating as well as relatively independent of the thickness of the coating. This feature of the invention is one of the principal advantages thereof since variations in coating thickness may be permitted within a much greater range than would be the case if the properties of the image depended on the overall percentage of silica in the coating, or upon the total amount thereof, that is, upon the product of the concentration of particles and the thickness of the coating.

In the finished coating, the silica particles are wetted to the extent that these surface particles are held in place but not to such an extent that a substantial amount of the silica-air interfacial area is affected. Since it is probable that the particles do not reach the above-described equilibrium state at the surface of the coating instantaneously upon application, it is preferred that the lacquer or other vehicle have a short but finite drying time to allow this equilibrium to be reached.

While the invention has been shown in only typical forms, it will be obvious to those skilled in the art that it is not to be so limited. On the contrary, the invention is susceptible of various forms and modifications without departing from the spirit and scope of the appended claims.

I claim:

1. A rear projection screen consisting of a transparent screen member and a coating layer of generally uniform thickness adhering directly to one face of the screen in substantial co-extensive contact therewith, said coating layer consisting essentially of a generally transparent film-forming organic binder and a plurality of finely divided, porous silica particles defining the outer surface of said layer, said particles having capillary passages therein and being held in place by said organic binder with portions of the particles exposed to atmosphere, whereby the outer surface layer of said coating layer exhibits a light diffusing property.

2. A rear projection screen as defined in claim 1 which also includes other silica particles disposed throughout said coating layer, and in which the overall total of said silica particles disposed throughout said coating layer and held in place on the outer surface thereof comprises from about 1% to about 5% by weight of said coating layer.

3. A rear projection screen as defined in claim 1 wherein the material comprising said transparent screen member is glass.

4. A rear projection screen as defined in claim 1 wherein the material comprising said transparent screen member is an acrylic plastic.

5. A rear projection screen as defined in claim 1 in which the material comprising said transparent screen member is a polymeric styrene plastic.

6. A rear projection screen as defined in claim 1 in which said silica particles are synthetically prepared, amorphous silica particles having an average particle size of from about 3 to 4 microns.

7. A rear projection screen as defined in claim 1 in which said organic layer comprises a nitrocellulose lacquer.

8. A rear projection screen as defined in claim 1 in which said organic coating layer comprises a vinyl lacquer.

9. A rear projection screen as defined in claim 1 wherein said coating layer has a thickness within the range of 0.001 to 0.025 inch.

References Cited
UNITED STATES PATENTS

| | | | |
|---|---|---|---|
| 2,689,804 | 9/1954 | Sadowsky | 117—124X |
| 2,726,573 | 12/1955 | Maloff | 350—127 |

ALFRED L. LEAVITT, Primary Examiner

W. F. CYRON, Assistant Examiner

U.S. Cl. X.R.

117—138.8; 350—126